Patented Nov. 6, 1923.

1,473,047

UNITED STATES PATENT OFFICE.

GUSTAV RAU, OF KANSAS CITY, MISSOURI, ASSIGNOR TO RAU CONSTRUCTION COMPANY, OF KANSAS CITY, MISSOURI.

COMPOSITION FOR BUILDING TILE.

No Drawing. Application filed October 3, 1922. Serial No. 592,031.

*To all whom it may concern:*

Be it known that I, GUSTAV RAU, a citizen of the United States, residing at Kansas City, in the county of Jackson and State of Missouri, have invented certain new and useful Improvements in Compositions for Building Tile, of which the following is a specification.

The object of my invention is the material used in making a new and useful wall tile or tiles used in partitions and other parts of a building. The material used is impervious to dampness, a nonconductor of heat or cold, and reduces the breakage, at least, twenty per cent as compared to the present tile now being used.

My composition consists of a mixture of plaster Paris, slacked lime, sawdust or other similar material, and cornstalks, either green or dried, and water.

In preparing the composition I prefer to have moulds of any desired form, shape or thickness, and to use the ingredients in about the following proportions—viz, sixty per cent plaster Paris, thirty per cent slacked lime, seven per cent sawdust from any species of wood and three per cent, or from one to five corn stalks placed through the tile longitudinally giving the tile strength and lightness in weight.

Good results may be obtained, however, when the ingredients are varied from, in the following limits: plaster Paris, fifty to seventy per cent; slacked lime, twenty to forty per cent; saw dust five to ten per cent, and from two to five per cent of corn stalks depending upon the size of the tile to be made.

These ingredients are mixed, excepting the corn stalks, with water sufficient to form a paste or mortar of such consistency as to enable it to be formed in the moulds made for the tile.

My composition is strong, fire proof, is a very efficient nonconductor of heat or cold, is impervious to dampness, will not crack very easily and in fact possesses all the desirable qualities desired for making tile, and qualities not possessed by the ordinary tile on the market today. It is very cheap in construction, easily made by any one with the necessary moulds.

What I claim as new, and desire to secure by Letters Patent, is:—

A composition consisting of seventy per cent plaster Paris, thirty per cent slacked lime, seven per cent saw dust and three per cent corn stalks, said corn stalks reenforcing said tile.

In testimony whereof I affix my signature.

GUS. RAU.